(12) United States Patent
Marlett et al.

(10) Patent No.: US 10,066,561 B2
(45) Date of Patent: Sep. 4, 2018

(54) CONTROL OF ENGINE EXHAUST BACKPRESSURE FOLLOWING ENGINE COLD-START

(71) Applicant: GM GLOBAL TECHNOLOGY OPERATIONS LLC, Detroit, MI (US)

(72) Inventors: Chad E. Marlett, Plymouth, MI (US); Lawrence P. Ziehr, Clarkston, MI (US); Francesco Cianflone, Turin (IT); Francesco Castorina, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 171 days.

(21) Appl. No.: 15/139,730

(22) Filed: Apr. 27, 2016

(65) Prior Publication Data

US 2017/0314486 A1    Nov. 2, 2017

(51) Int. Cl.
| | |
|---|---|
| F02B 33/44 | (2006.01) |
| F02M 25/07 | (2006.01) |
| F01N 5/00 | (2006.01) |
| F01N 3/00 | (2006.01) |
| F02D 41/06 | (2006.01) |
| F01N 3/021 | (2006.01) |
| F01N 3/20 | (2006.01) |

(Continued)

(52) U.S. Cl.
CPC ........... *F02D 41/068* (2013.01); *F01N 3/021* (2013.01); *F01N 3/2066* (2013.01); *F02B 37/22* (2013.01); *F02D 9/04* (2013.01); *F02D 41/0055* (2013.01); *F02D 41/26* (2013.01); *F02D 41/3035* (2013.01); *F02M 26/06* (2016.02); *F02M 26/10* (2016.02); *F02M 26/15* (2016.02); *F02D 41/064* (2013.01); *F02D 2200/021* (2013.01); *F02D 2250/34* (2013.01)

(58) Field of Classification Search
CPC ........ F02D 41/068; F02D 41/26; F01N 3/021; F01N 3/2066; F02B 37/22
USPC .......................... 60/605.2, 281, 286; 701/108
See application file for complete search history.

(56) References Cited

U.S. PATENT DOCUMENTS

| | | | | |
|---|---|---|---|---|
| 5,105,619 A | * | 4/1992 | Arai | ......................... F01N 3/023 60/286 |
| 6,164,063 A | * | 12/2000 | Mendler | ................. F02M 26/35 60/278 |

(Continued)

FOREIGN PATENT DOCUMENTS

FR    2913057 A1 *  8/2008  ............... F01N 5/02

*Primary Examiner* — Thai Ba Trieu
(74) *Attorney, Agent, or Firm* — Quinn IP Law

(57) ABSTRACT

A method of controlling a rate of warm-up of an internal combustion engine fluidly connected to an exhaust system is disclosed. The method includes identifying a cold-start of the engine. The method also includes regulating, in response to the identified cold-start of the engine, an exhaust pressure modulation (EPM) valve arranged in a main exhaust passage of the exhaust system. The main exhaust passage channels engine exhaust gas to the ambient. Such regulation of the EPM valve will restrict a flow of the engine exhaust gas to the ambient and increase exhaust gas backpressure in the exhaust system up to a predetermined pressure value. Furthermore, the subject regulation of the EPM valve will increase a load on and the rate of warm-up of the engine. A vehicle having an engine and a controller programmed to control a rate of the engine's warm-up of according to the method is also disclosed.

14 Claims, 3 Drawing Sheets

(51) Int. Cl.
    *F02B 37/22*     (2006.01)
    *F02D 41/26*     (2006.01)
    *F02D 41/30*     (2006.01)
    *F02D 9/04*     (2006.01)
    *F02D 41/00*     (2006.01)
    *F02M 26/06*     (2016.01)
    *F02M 26/10*     (2016.01)
    *F02M 26/15*     (2016.01)

(56) References Cited

U.S. PATENT DOCUMENTS

| | | | |
|---|---|---|---|
| 8,196,568 B2* | 6/2012 | Springer | F02M 26/35 |
| | | | 60/605.2 |
| 9,556,771 B2* | 1/2017 | Ulrey | F01N 3/10 |
| 9,689,295 B1* | 6/2017 | Uhrich | F02M 26/22 |
| 2006/0137665 A1* | 6/2006 | Khair | F02M 26/05 |
| | | | 60/605.2 |
| 2014/0144414 A1* | 5/2014 | Dean | F02D 41/006 |
| | | | 123/568.14 |
| 2014/0196454 A1* | 7/2014 | Ulrey | F01N 3/10 |
| | | | 60/605.2 |
| 2015/0121847 A1* | 5/2015 | Pursifull | F01N 5/02 |
| | | | 60/274 |
| 2015/0121848 A1* | 5/2015 | Pursifull | F01N 5/02 |
| | | | 60/274 |
| 2015/0128907 A1* | 5/2015 | Redon | F02D 41/0002 |
| | | | 123/46 R |
| 2016/0339764 A1* | 11/2016 | Pursifull | F02D 41/0065 |

* cited by examiner

CONTROL OF ENGINE EXHAUST BACKPRESSURE FOLLOWING ENGINE COLD-START

TECHNICAL FIELD

The present disclosure relates to control of exhaust backpressure in an internal combustion engine following a cold-start of the engine.

BACKGROUND

A majority of modern motor vehicles employ internal combustion engines for propulsion. As a by-product of generating power, an internal combustion engine generates a stream of exhaust gas and also gives off heat energy. Accordingly, after a cold-start of the engine, i.e., when the engine is activated with its temperature at or near ambient, the engine proceeds through a "warm-up" period during which the engine's operating temperature is steadily increased.

During the first couple minutes after starting an internal combustion engine that has been started from cold, an amount of exhaust emissions can be significantly higher than emissions during the engine's steady state operation. In cold engines fuel does not vaporize completely, thus requiring richer air-fuel ratios. Rich air-fuel ratios, in turn, generate higher emissions of hydrocarbons, nitrogen oxides, and carbon monoxide, which diminish only as the engine reaches operating temperature. Cold engines also generate increased emissions because catalytic converters are less efficient under cold conditions and until they reach their operating temperature.

As the engine is started from cold and proceeds through the "warm-up" period, a passenger cabin of the host motor vehicle can also take time to warm-up from ambient temperature. Cabin warm-up in motor vehicles is frequently accomplished by a system capturing the engine's by-product heat energy via engine coolant, and then circulating the engine coolant through a heat-exchanger to transfer the heat energy to air forced into the vehicle cabin. Accordingly, in such systems, cabin warm-up is influenced by the rate of engine warm-up.

SUMMARY

A method of controlling a rate of warm-up of an internal combustion engine is disclosed. The engine is fluidly connected to an exhaust system configured to channel engine exhaust gas to the ambient. The method includes identifying a cold-start of the engine. The method also includes regulating, in response to the identified cold-start of the engine, an exhaust pressure modulation (EPM) valve arranged in a main exhaust passage of the exhaust system. According to the disclosure, the main exhaust passage channels engine exhaust gas to the ambient. Such regulation of the EPM valve is intended to restrict a flow of the engine exhaust gas to the ambient and increase exhaust gas backpressure in the main exhaust passage up to a predetermined pressure value. Furthermore, the subject regulation of the EPM valve will increase a load on and the rate of warm-up of the engine.

The predetermined pressure value for the increased backpressure in the exhaust system may be in a range of 50-100 KPa.

The exhaust system includes an exhaust gas recirculation (EGR) passage fluidly connecting the main exhaust passage to the engine, and a low pressure exhaust gas recirculation (LPEGR) valve arranged in the EGR passage and in electronic communication with the controller. In such a case, the method may also include regulating the LPEGR valve to selectively control flow of the engine exhaust gas through the EGR passage following regulation of the EPM valve in response to the identified cold-start of the engine.

According to the disclosure, the regulating of the LPEGR valve to selectively control the flow of the engine exhaust gas through the EGR passage may include directing up to 30% of an entire flow of the exhaust gas from the main exhaust passage through the EGR passage for exhaust gas recirculation.

The engine may additionally include a variable geometry turbocharger (VGT) having adjustable vanes. In such a case, the method may also include regulating, via the controller, the LPEGR valve to direct the exhaust gas to the VGT following regulation of the EPM valve in response to the identified cold-start of the engine.

The method may also include minimizing condensation of moisture in the exhaust gas at the VGT via maintaining the LPEGR valve in a fully-closed state when a temperature of the ambient is below −10 degrees Celsius.

The engine may be a compression-ignition engine and the exhaust system may additionally include an exhaust after-treatment device upstream of the EPM valve. The method may also include increasing the exhaust backpressure in the main exhaust passage for a first predetermined duration to thereby trigger or accelerate a light-off of the exhaust after-treatment device.

The exhaust after-treatment device may be a Diesel Particulate Filter (DPF).

An engine coolant may be used to remove heat energy from the engine. In such a case, the act of identifying the cold-start of the engine may be accomplished by detecting a temperature of the engine coolant via a coolant sensor arranged on the engine and in electronic communication with the controller. Additionally, identifying the cold-start of the engine may be accomplished by detecting the temperature of engine coolant being below a predetermined temperature value.

The engine may be arranged in a vehicle having a passenger cabin and a heater as part of a heating, ventilation, and air conditioning (HVAC) system configured to receive the engine coolant for regulating a temperature of air inside the cabin. In such a case, the method may include increasing the exhaust backpressure in the main exhaust passage for a second predetermined duration to thereby increase the temperature of air inside the cabin, i.e., facilitate heater warm-up.

The method may also include, following an elapse of at least one of the first predetermined duration and the second predetermined duration, opening the EPM valve by the controller to derestrict the flow of the exhaust gas through the main passage and decrease the exhaust backpressure in the main exhaust passage below the predetermined pressure value.

Another embodiment of the disclosure is directed to a vehicle having a controller for controlling the rate of warm-up of the internal combustion engine as described above.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
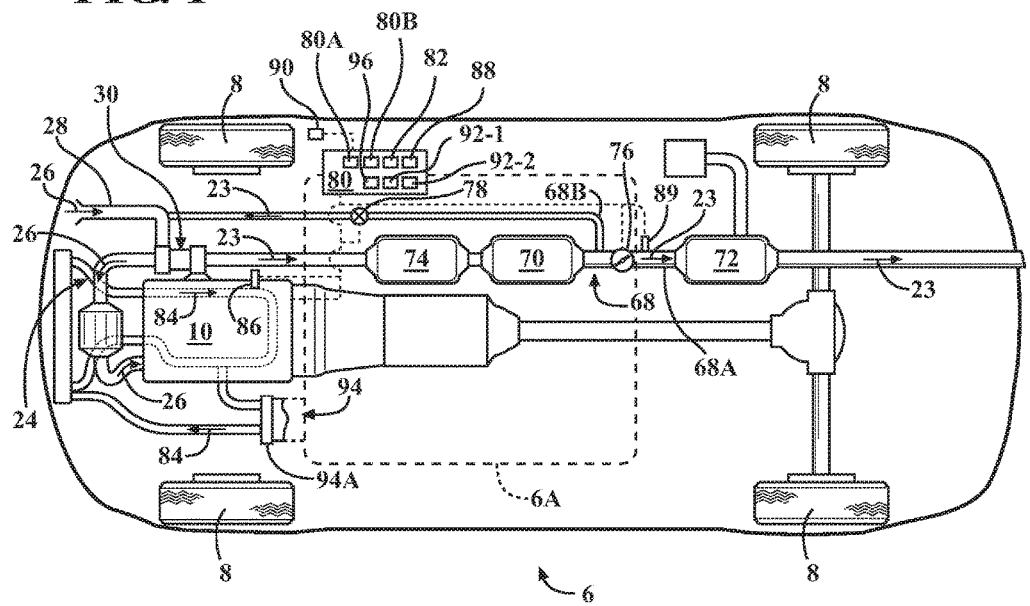
FIG. 1 is a schematic illustration of a vehicle having a heating, ventilation, and air conditioning (HVAC) system, an internal combustion engine fluidly connected to an exhaust system with an exhaust after-treatment device, an exhaust pressure modulation (EPM) valve, a low pressure exhaust gas recirculation (LPEGR) valve arranged in an EGR passage, and a variable geometry turbocharger (VGT) according to the disclosure.
Figure 2:
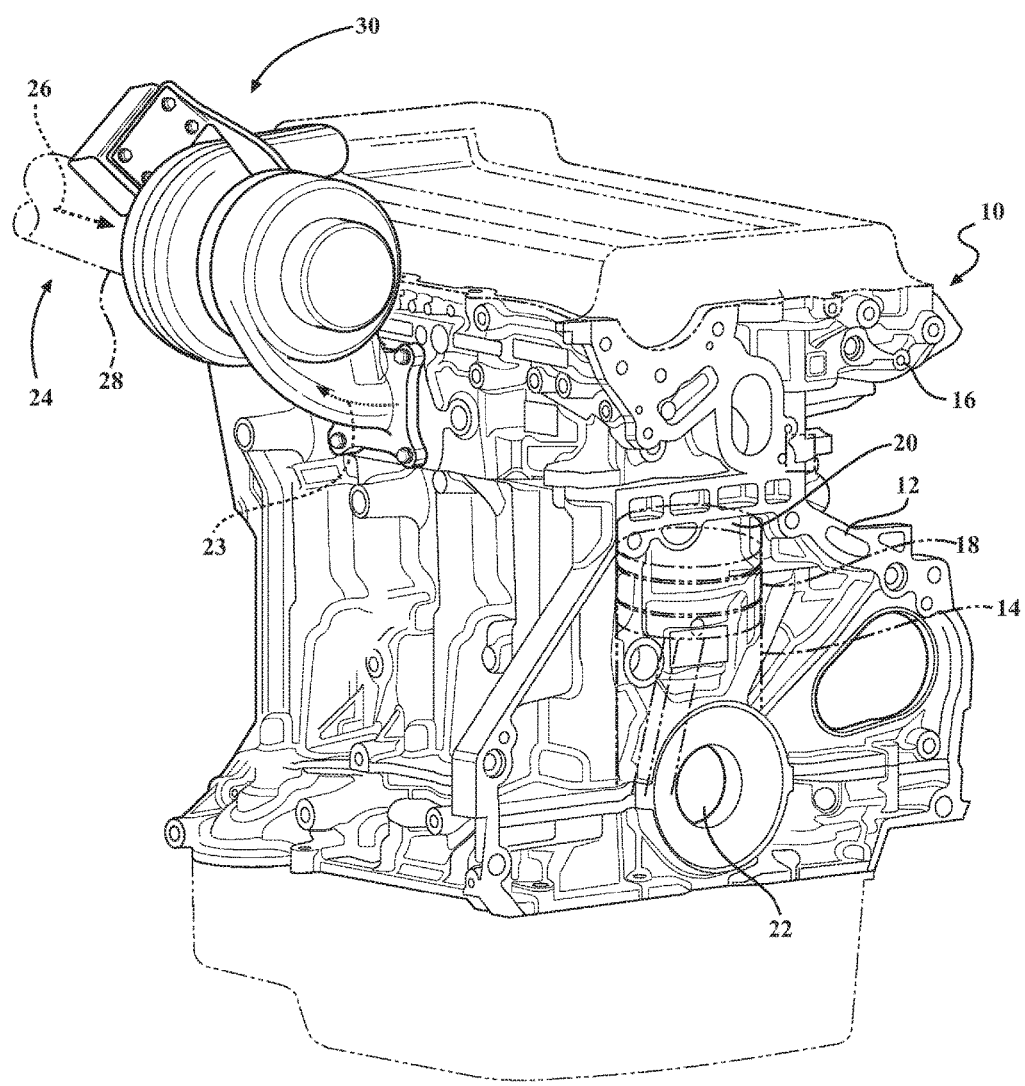
FIG. 2 is a schematic perspective close-up view of the engine shown in FIG. 1.

Referring to the drawings wherein like reference numbers correspond to like or similar components throughout the several figures, FIG. 1 illustrates a vehicle 6 having a plurality of wheels 8 that may be driven by an internal combustion engine (ICE) 10. As shown in FIG. 2, the ICE 10 includes a cylinder block 12 with a plurality of cylinders 14 arranged therein. The ICE 10 also includes a cylinder head 16. Each cylinder 14 includes a piston 18 configured to reciprocate therein. Although the ICE 10 may be either a spark-ignition, i.e., gasoline, engine, or a compression-ignition, i.e., diesel, engine, the present disclosure will focus primarily on diesel configuration of the ICE.

As shown in FIG. 2, combustion chambers 20 are formed within the cylinders 14 between the bottom surface of the cylinder head 16 and the tops of the pistons 18. As known by those skilled in the art, combustion chambers 20 are configured to receive fuel and air such that a fuel-air mixture may form for subsequent combustion therein. The ICE 10 also includes a crankshaft 22 configured to rotate within the cylinder block 12. The crankshaft 22 is rotated by the pistons 18 as a result of increased pressure from the burning fuel-air mixture in the combustion chambers 20. After the air-fuel mixture is burned inside a specific combustion chamber 20, the reciprocating motion of a particular piston 18 serves to expend post-combustion exhaust gases 23 from the respective cylinder 14.

A flow of the post-combustion exhaust gases 23 may be controlled to provide exhaust braking in the ICE 10. As understood by those skilled in the art, exhaust braking is a means of slowing a diesel engine, e.g., the ICE 10, by restricting or closing a path of exhaust flow from the engine when fuel to the engine has been shut off. The restriction of the engine exhaust gas flow causes the exhaust gases to be compressed inside the engine and generate significantly increased backpressure inside the engine. The increased backpressure slows down the engine, which in turn decelerates the host vehicle. The amount of torque generated by the engine when exhaust braking is applied is generally proportional to the backpressure generated inside the engine.

The ICE 10 also includes an induction system 24 configured to channel an airflow 26 from the ambient to the cylinders 14. As shown, the induction system 24 may include an intake air duct 28, a variable geometry turbocharger (VGT) 30, and an intake manifold (not shown). Although not shown, the induction system 24 may additionally include an air filter upstream of the VGT 30 for removing foreign particles and other airborne debris from the airflow 26. The intake air duct 28 is configured to channel the airflow 26 from the ambient to the VGT 30, while the VGT is configured to pressurize the received airflow, and discharge the pressurized airflow to the intake manifold. The intake manifold in turn distributes the previously pressurized airflow 26 to the cylinders 14 for mixing with an appropriate amount of fuel and subsequent combustion of the resultant fuel-air mixture.

Figure 3:
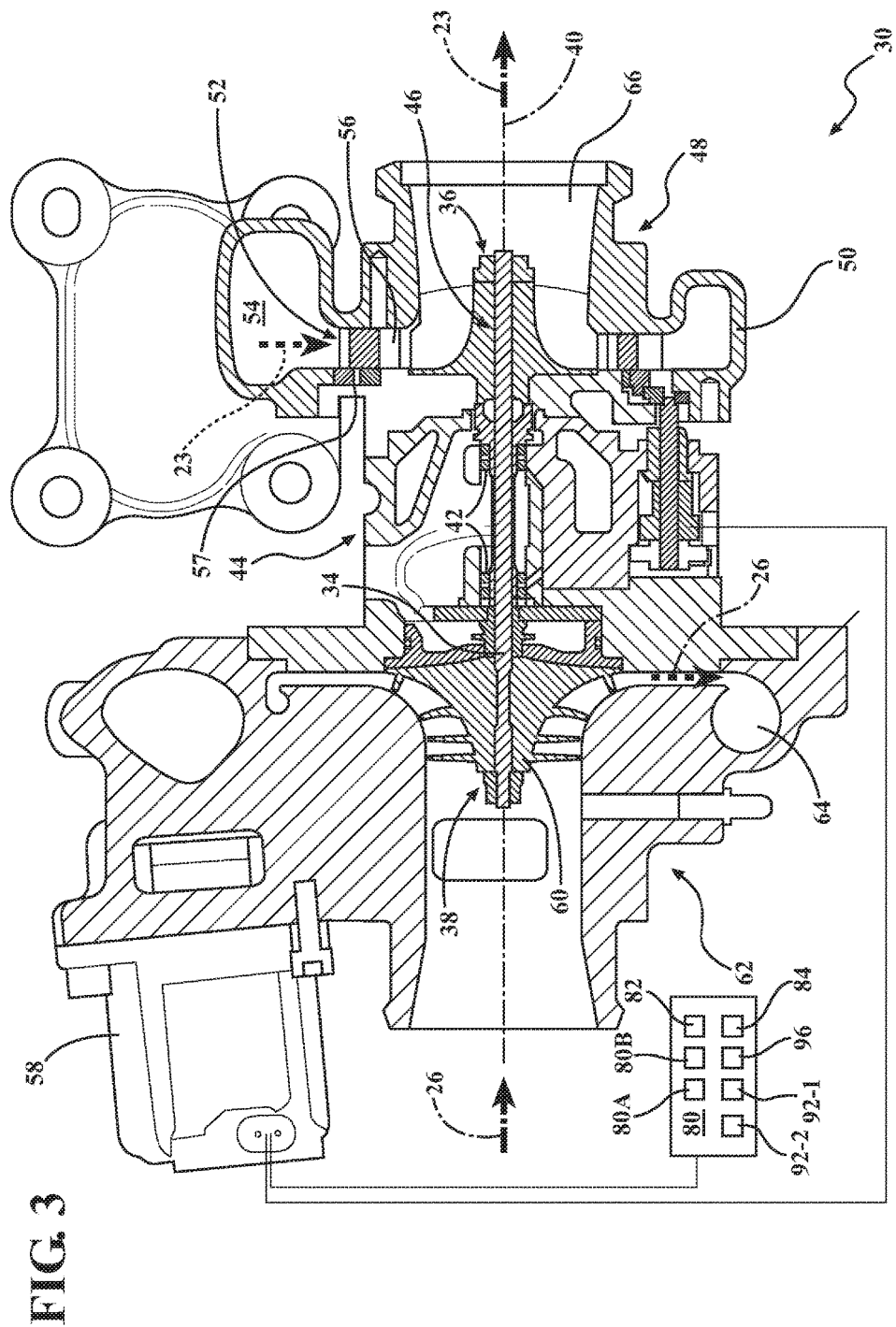
FIG. 3 is a schematic cross-sectional view of the VGT shown in FIGS. 1 and 2.

As shown in FIG. 3, the VGT 30 includes a shaft 34 having a first end 36 and a second end 38. The shaft 34 is supported for rotation about an axis 40 via bearings 42. The bearings 42 are mounted in a bearing housing 44 and may be lubricated by a supply of oil. A turbine wheel 46 is mounted on the shaft 34 proximate to the first end 36 and configured to be rotated about the axis 40 by the exhaust gases 23 emitted from the cylinders 14. The turbine wheel 46 is retained inside a turbine housing 48 that includes a volute or scroll 50. The scroll 50 defines an inlet 54 to the turbine wheel 46. The scroll 50 receives the post-combustion exhaust gases 23 and directs the exhaust gases to the turbine wheel 46 through the inlet 54. As a result, the turbine wheel 46 and the shaft 34 are rotated together by the exhaust gases 23 about the axis 40. The scroll 50 is configured to achieve specific performance characteristics, such as efficiency and response, of the VGT 30.

The VGT 30 also includes a variable position vane mechanism 52. As shown, the vane mechanism 52 includes a plurality of movable vanes 56 arranged at the inlet 54. Each vane 56 is mounted and rotatable with respect to the turbine housing 48 via individual pin or axle arrangement 57. The vanes 56 are configured to move relative to the turbine housing 48 in order to select a specific aspect ratio (A:R) of the inlet 54 to the turbine wheel 46. As understood by those skilled in the art, the aspect ratio (or A:R) is defined as the ratio of the width of a shape to its height. The vanes 56 are configured to rotate between and inclusive of fully-opened, where the entry to the inlet 54 is substantially unrestricted via the vanes being positioned substantially parallel to the flow of post-combustion exhaust gases 23, and fully-closed, where the entry to the inlet 54 is blocked via the vanes being positioned substantially orthogonal to the flow of post-combustion exhaust gases. The vane mechanism 52 may also include an actuator 58. As shown, the actuator 58 is configured to selectively vary the position of the vane mechanism 52, and specifically the vanes 56 to select a specific A:R of the inlet 54 to the turbine wheel 46.

The vane mechanism 52 is configured to selectively alter the effective aspect ratio (A:R) of the VGT 30 by altering the effective geometry of the turbine housing 48 in line with operating speed of the ICE 10 and thus facilitate increased ICE operating efficiency. Operating efficiency of the ICE 10 can be increased through the use of the vane mechanism 52 because during lower operating speeds of a typical ICE optimum A:R is very different from the A:R that would be optimum during higher operating speeds. In a fixed A:R turbocharger, if the A:R is too large, the turbocharger may produce insufficient boost at lower speeds, on the other hand, if the A:R is too small, the turbocharger may choke the ICE 10 at higher speeds, leading to increased exhaust backpressure and pumping losses, and ultimately result in lower power output. By altering the geometry of the turbine housing 48 as the ICE 10 accelerates, the A:R of VGT 30 can be maintained near its optimum. As a consequence of its ability to operate near optimum A:R, the VGT 30 will exhibit a reduced amount of boost lag, have a lower boost threshold, and will also be more efficient at higher engine speeds in comparison to a fixed A:R turbocharger. An additional benefit in the VGT 30 is that the VGT does not require and typically does not include a wastegate to regulate rotational speed of the turbine wheel 46.

The VGT 30 also includes a compressor wheel 60 mounted on the shaft 34 between the first and second ends 36, 38. The compressor wheel 60 is configured to pressurize the airflow 26 being received from the ambient for eventual delivery to the cylinders 14. The compressor wheel 60 is retained inside a compressor cover 62 that includes a volute or scroll 64. The scroll 64 receives the airflow 26 from the compressor wheel 60 after the airflow has been compressed. The scroll 64 is configured to achieve specific performance characteristics, such as peak airflow and efficiency of the VGT 30. Accordingly, rotation is imparted to the shaft 34 by the post-combustion exhaust gases 23 energizing the turbine wheel 46, and is in turn communicated to the compressor wheel 60 owing to the compressor wheel being fixed on the shaft. As understood by those skilled in the art, the variable flow and force of the post-combustion exhaust gases 23 influences the amount of boost pressure that may be generated by the compressor wheel 60 throughout the operating range of the ICE 10.

After the post-combustion exhaust gases 23 have passed through the scroll 50 and rotated the turbine wheel 46 together with the compressor wheel 64, the exhaust gases exit the turbine housing 48 via an outlet 66 and are directed into an exhaust system 68. The exhaust system 68 is configured to channel the exhaust gases 23 from the ICE 10 to the ambient via a main exhaust passage 68A. As shown, the main exhaust passage 68A may include a number of exhaust after-treatment devices configured to methodically remove largely carbonaceous particulate byproducts of engine combustion from the post-combustion exhaust gases 23 and reduce emissions of such particulates to the ambient. As shown in FIG. 1, such exhaust after-treatment devices may include a diesel particulate filter (DPF) 70, a selective catalytic reduction (SCR) catalyst 72, and a lean $NO_X$ trap (LNT) 74. Although not particularly shown, some other embodiments of the exhaust system 68 may also include a diesel oxidation catalyst (DOC).

The exhaust system 68 also includes an exhaust pressure modulation (EPM) valve 76. The EMP valve 76 is configured to selectively restrict the main exhaust passage 68A to vary an exhaust backpressure therein. Additionally, the exhaust system 68 may include an exhaust gas recirculation (EGR) passage 68B fluidly connecting the main exhaust passage 68A to the ICE 10 and a low pressure exhaust gas recirculation (LPEGR) valve 78 arranged in the EGR passage. The LPEGR valve 78 is configured to selectively control the flow of engine exhaust gases 23 through the EGR passage 68B for exhaust gas recirculation into the ICE 10. In the specific case of the ICE including the VGT 30, the LPEGR valve 78 may route the exhaust gases 23 directly to the VGT.

As shown in FIG. 1, the vehicle 6 also includes a controller 80 configured to regulate operation of the ICE 10. Each of the EMP valve 76 and the LPEGR valve 78 is in electronic communication with the controller 80. The controller 80 is configured to regulate the EMP valve 76 to vary the exhaust backpressure in the main exhaust passage 68A and regulate the LPEGR valve 78 for selective control of the flow of engine exhaust gases 23 through the EGR passage 68B. The controller 80 may include a central processing unit (CPU) that regulates various functions on the vehicle 6 or be configured as a dedicated electronic control unit (ECU) for the ICE 10. In either configuration, the controller 80 includes a processor 80A and tangible, non-transitory memory 80B, which includes instructions for the EMP valve 76 and the LPEGR valve 78 programmed therein. As such, the processor 80A is configured to execute the instructions from memory in the controller 80 to regulate the ICE 10, including the operation of the EMP valve 76 and the LPEGR valve 78. The non-transitory memory 80B may also include operating instructions for the actuator 58 of the VGT 30. The actuator 58 may have an electro-mechanical configuration and be in electronic communication with the controller 80. Accordingly, the actuator 58 may receive a command signal 82 from the controller 80 to vary the position of the vanes 56 and select a specific A:R of the inlet 54.

Additionally, the controller 80 may be programmed to regulate the EPM valve 76 to increase the backpressure in the main exhaust passage 68A once the ICE 10 undergoes a cold-start. A cold-start of the ICE 10 is generally a condition when engine start occurs after the ICE has remained out of operation for an extended period of time and has cooled off substantially or approximately to the ambient temperature. An indicator of the temperature of the ICE 10 can be a temperature of an engine coolant 84. The temperature of the engine coolant 84 can be detected directly by a coolant sensor 86. The subject coolant sensor 86 can be in electronic communication with the controller 80. The controller 80 can be configured to identify an occurrence of the cold-start of the ICE 10 via the coolant sensor 86 detecting the temperature of the engine coolant 84 below a predetermined temperature value, such as substantially equivalent to ambient temperature. Specifically, following the detected cold-start, the controller 80 may be programmed to regulate the EPM valve 76 to increase the backpressure in the exhaust system 68 up to a predetermined pressure value 88. Such a predetermined exhaust gas pressure value 88 can be in the range of 50-100 KPa.

The actual exhaust backpressure in the main exhaust passage 68A can be detected and communicated to the controller 80 via a pressure sensor 89 for close-loop regulation via the controller, or the EPM valve 76 position can be empirically calibrated for open-loop control. It is envisioned that an appropriate increase in the main exhaust passage 68A backpressure can be achieved via a partially-closed position of the EPM valve 76. In response to the identified cold-start of the engine, the controller 80 can be configured to regulate the EPM valve 76 in order to restrict a flow of the engine exhaust gases 32 to the ambient. Such an increase in exhaust gas 32 backpressure in the main exhaust passage 68A is, in turn, intended to increase a load on the ICE 10 and affect an accelerated warm-up thereof.

The controller 80 can also be configured to regulate the LPEGR valve 78 to direct the exhaust gases 23 to the VGT 30 following the increase of backpressure in the main exhaust passage 68A via the EPM valve 76 in response to the identified cold-start of the engine 10. The controller 80 can be additionally configured to minimize condensation of moisture in the exhaust gases 23 at the VGT 30 that can take place when hot exhaust gases contact significantly cooler components of the VGT. To thus minimize condensation of moisture in the exhaust gases 23, the controller can be programmed to maintain the LPEGR valve 78 in a fully-closed state when a temperature of the ambient is below −10 degrees Celsius. To facilitate such control of the LPEGR valve 78, the ambient temperature can be detected and communicated to the controller 80 via a dedicated sensor 90, shown in FIG. 1.

Specifically, the controller 80 can be configured to direct up to about 30% of the entire flow of exhaust gases 23 in the main exhaust passage 68A via regulating the LPEGR valve 78 for exhaust gas recirculation through the EGR passage 68B. As described above, regulation of the LPEGR valve 78 can be used to direct the exhaust gases 23 to the VGT 30. Accordingly, in a specific embodiment, such a specific percentage of EGR can also be channeled directly to the VGT 30. Additionally, in the situation where the LPEGR valve 78 has been regulated to open flow of the engine exhaust gas through the EGR passage 68B, the controller 80 can also regulate the actuator 58 to selectively restrict flow of the exhaust gases 23 through the VGT 30 via specific positions of the vane mechanism 52. Such regulation of the actuator 58 can serve to more precisely control the amount of EGR, as well as the exhaust backpressure during cold-start of the ICE 10.

The controller 80 can be additionally configured to trigger, i.e., facilitate or accelerate, a light-off of exhaust after-treatment device(s) discussed above by increasing the exhaust backpressure in the main exhaust passage 68A for a first predetermined duration 92-1. The specific first duration 92-1 for which the increased exhaust backpressure can be in effect may be detected via a timer (not shown) used by the controller 80. In the disclosed embodiment where the ICE 10 is a compression-ignition engine that includes any or all the exhaust after-treatment device(s) discussed above, but at least the DPF 70, upstream of the EPM valve 76, the controller 80 can thus be configured to trigger a light-off of such exhaust after-treatment device(s).

With resumed reference to FIG. 1, the vehicle 6 employing the ICE 10 can also include a passenger cabin 6A having a heating, ventilation, and air conditioning (HVAC) system 94 for controlling temperature and humidity therein. The HVAC system 94 includes a coolant to air heat exchanger or heater 94A configured to receive the engine coolant 84 for regulating a temperature of air inside the cabin 6A. As understood by those skilled in the art, such an HVAC system 94 typically also employs a selectable speed fan (not shown) to drive cabin air through the heater 94A. In such an embodiment, the controller 80 can be additionally configured to increase the exhaust backpressure in the main exhaust passage 68A for a second predetermined duration 92-2 to thereby increase the load on the ICE 10 to increase thermal energy rejection and heat up the engine coolant 84 more rapidly following the ICE cold-start. Thus rapidly heated engine coolant 84 is then circulated to the heater 94A, facilitating a more rapid warm-up of the heater, the cabin air passed through the heater, and, consequently, the air temperature inside the cabin 6A.

The controller 80 can be additionally configured to open the EPM valve 76 and thereby derestrict the flow of the exhaust gases 23 through the main passage 68A and decrease the exhaust backpressure in the main passage below the range of the predetermined pressure value 88. Such opening of the EPM valve 76 can be caused to occur following an elapse of at least one of the first predetermined duration 92-1 and the second predetermined duration 92-2. Alternatively, such opening of the EPM valve 76 can be caused to occur following a detection, via the coolant sensor 86, of the temperature of the engine coolant 84 having increased above a predetermined or threshold coolant temperature value 96, and/or a detection of the light-off of the exhaust after-treatment device, such as the DPF 70, via the controller 80. Accordingly, in such an embodiment, the controller 80 can be programmed with the threshold coolant temperature value 96.

Figure 4:
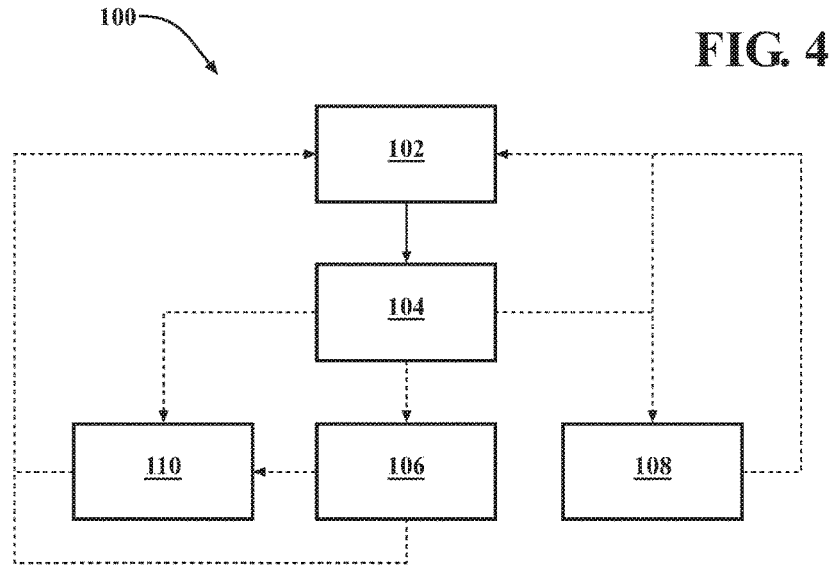
FIG. 4 is a flow diagram of a method used to control a rate of warm-up of the engine shown in FIGS. 1-2.

FIG. 4 depicts a method 100 of controlling a rate of warm-up of the ICE 10, as described above with respect to FIGS. 1-3. The method commences in frame 102 with identifying, via the controller 80, a cold-start of the ICE 10. As described above, an occurrence of the cold-start of the ICE 10 can be identified via the coolant sensor 86 detecting temperature of the engine coolant 84 being below some predetermined or threshold value. Specifically, when the ICE 10 is started from cold, the temperature of its coolant 84 would be substantially equivalent to ambient temperature.

Following and in response to the identification of the cold-start of the ICE 10, the method advances to frame 104. In frame 104 the method includes regulating the EPM valve 76, via the controller 80, to restrict the flow of the engine exhaust gases 23 to the ambient. As described with respect to FIGS. 1-3, such restriction of the flow of engine exhaust gases 23 is intended to increase exhaust gas backpressure in the main exhaust passage 68A up to the predetermined pressure value 88 and thereby increase a load on and the rate of warm-up of the ICE 10. As discussed above, the predetermined pressure value 88 can be in the range of 50-100 KPa.

In the embodiment of the exhaust system 68 that includes an exhaust after-treatment device, such as the DPF 70, in frame 104 the method may include increasing the exhaust backpressure in main exhaust passage 68A for the first predetermined 92-1 to thereby trigger a light-off of the particular exhaust after-treatment device. Additionally, in the embodiment where the ICE 10 is arranged in the vehicle 6 having the heater 94A for the passenger cabin 6A, in frame 104 the method may include increasing the exhaust backpressure in the main exhaust passage 68A for the second predetermined duration 92-2. In such an embodiment, and as discussed above, increasing the exhaust backpressure in the main exhaust passage 68A for the second predetermined duration 92-2 is intended to increase the temperature of air inside the cabin 6A via more rapid heater warm-up.

In the embodiment of exhaust system 68 that includes the EGR passage 68B and the LPEGR valve 78 arranged in the EGR passage, after frame 104 the method may advance to frame 106. According to the disclosure, in frame 106, the method may include regulating the LPEGR valve 78 to selectively control flow of the engine exhaust gas through the EGR passage 68B. As described above, regulation of the LPEGR valve 78 can be used to direct the exhaust gases 23 to the VGT 30. On the other hand, an in an alternative embodiment, following frame 104 the method can proceed to frame 108, where the method includes maintaining the LPEGR valve 78 in its fully-closed state if the temperature of the ambient is below −10 degrees Celsius.

Following either frame 104 or frame 106, and following the elapse of at least one of the first and second predetermined durations 92-1, 92-2, i.e., following the light-off of the exhaust after-treatment device and/or desired heater warm-up, the method may proceed to frame 110. In frame 110 the method may include opening the EPM valve 76 to derestrict the flow of the exhaust gasses 23 through the main passage 68A and decrease the exhaust backpressure in the main passage below the predetermined pressure value 88, thus returning the ICE 10 to initial or start-up backpressure operation. The method may return to frame 102 from any of the frames 104-110 following each shut-down of the ICE 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling a rate of warm-up of an internal combustion engine having a variable geometry turbocharger (VGT) including a compressor and a turbine with adjustable vanes fluidly connected to an exhaust system, the method comprising:
identifying, via a controller, a cold-start of the engine;
regulating, via the controller, in response to the identified cold-start of the engine, an exhaust pressure modulation (EPM) valve arranged in a main exhaust passage of the exhaust system, wherein the main exhaust passage channels engine exhaust gas to the ambient, to restrict a flow of the engine exhaust gas to the ambient and increase exhaust gas backpressure in the main exhaust passage up to a predetermined pressure value to thereby increase a load on and the rate of warm-up of the engine;
regulating, via the controller, a low pressure exhaust gas recirculation (LPEGR) valve to selectively control flow of the engine exhaust gas through an LPEGR passage following said regulating the EPM valve in response to the identified cold-start of the engine,
wherein
the LPEGR passage fluidly connects the main exhaust passage to the engine, and
the LPEGR valve is arranged in the LPEGR passage;
determining ambient temperature via a sensor; and
maintaining the LPEGR valve in a fully-closed state, via the controller, to minimize condensation of moisture in the exhaust gas at the turbine of the VGT when the ambient temperature has been determined to be below −10 degrees Celsius.

2. The method of claim 1, wherein said regulating the LPEGR valve to selectively control the flow of the engine exhaust gas through the LPEGR passage includes directing up to 30% of an entire flow of the exhaust gas from the main exhaust passage through the LPEGR passage.

3. The method of claim 1, wherein the engine is a compression-ignition engine and the exhaust system additionally includes an exhaust after-treatment device upstream of the EPM valve, the method further comprising: increasing the exhaust backpressure in the main exhaust passage for a first predetermined duration to thereby trigger a light-off of the exhaust after-treatment device via regulating the EPM valve.

4. The method of claim 3, wherein the exhaust after-treatment device is a Diesel Particulate Filter (DPF).

5. The method of claim 3, wherein an engine coolant is used to remove heat energy from the engine, and wherein said identifying the cold-start of the engine is accomplished by detecting a temperature of the engine coolant via a coolant sensor arranged on the engine and in electronic communication with the controller.

6. The method of claim 5, wherein the engine is arranged in a vehicle having a passenger cabin and a heater configured to receive the engine coolant for regulating a temperature of air inside the cabin, the method further comprising: increasing the exhaust backpressure in the main exhaust passage for a second predetermined duration to thereby increase the temperature of air inside the cabin via regulating the EPM valve.

7. The method of claim 6, further comprising: following an elapse of at least one of the first predetermined duration and the second predetermined duration, opening the EPM valve by the controller to derestrict the flow of the exhaust gas through the main exhaust passage and decrease the exhaust backpressure in the main passage below the predetermined pressure value.

8. A vehicle comprising:
an internal combustion engine;
a variable geometry turbocharger (VGT) having a turbine with adjustable vanes and a compressor;
an exhaust system fluidly connected to the engine and having a main exhaust passage configured to channel engine exhaust gas to the ambient;
an exhaust pressure modulation (EPM) valve arranged in the main exhaust passage and configured to vary an exhaust backpressure in the main exhaust passage;
a sensor configured to detect ambient temperature;
a low pressure exhaust gas recirculation (LPEGR) passage fluidly connecting the main exhaust passage to the engine;
an LPEGR valve arranged in the LPEGR passage; and
a controller including executable instructions stored in a non-transitory medium to:
identify a cold-start of the engine;
regulate, in response to the identified cold-start of the engine, the EPM valve to restrict a flow of the engine exhaust gas to the ambient and increase exhaust gas backpressure in the main exhaust passage up to a predetermined pressure value to thereby increase a load on and the rate of warm-up of the engine;
regulate the LPEGR valve to selectively control flow of the engine exhaust gas through an LPEGR passage following the regulation of the EPM valve in response to the identified cold-start of the engine;
regulate the LPEGR valve to direct the exhaust gas to the compressor of the VGT following regulation of the EPM valve in response to the identified cold-start of the engine;
determine ambient temperature: and
maintain the LPEGR valve in a fully-closed state to minimize condensation of moisture in the exhaust gas at the turbine of the VGT when the ambient temperature has been determined to be below −10 degrees Celsius.

9. The vehicle of claim 8, wherein the controller includes additional executable instructions to regulate the LPEGR valve to direct up to 30% of an entire flow of the exhaust gas from the main exhaust passage through the LPEGR passage.

10. The vehicle of claim 8, wherein the engine is a compression-ignition engine and the exhaust system additionally includes an exhaust after-treatment device upstream of the EPM valve, wherein the controller includes additional executable instructions to increase the exhaust backpressure in the main exhaust passage for a first predetermined duration to thereby trigger a light-off of the exhaust after-treatment device via regulating the EPM valve.

11. The vehicle of claim 10, wherein the exhaust after-treatment device is a Diesel Particulate Filter (DPF).

12. The vehicle of claim 10, further comprising a coolant sensor in electronic communication with the controller, wherein an engine coolant is used to remove heat energy from the engine, and wherein the controller includes additional executable instructions to identify the cold-start of the engine by detecting a temperature of the engine coolant via the coolant sensor.

13. The vehicle of claim 12, wherein the engine is arranged in a vehicle having a passenger cabin and a heater configured to receive the engine coolant for regulating a temperature of air inside the cabin, and wherein the controller includes additional executable instructions to increase the exhaust backpressure in the main exhaust passage for a second predetermined duration to thereby increase the temperature of air inside the cabin via regulating the EPM valve.

14. The vehicle of claim 13, wherein the controller includes additional executable instructions to open the EPM valve following an elapse of at least one of the first predetermined duration and the second predetermined duration, and thereby derestrict the flow of the exhaust gas through the main passage and decrease the exhaust backpressure in the main exhaust passage below the predetermined pressure value.

* * * * *